United States Patent

Tsukamoto et al.

[11] Patent Number: 5,768,952
[45] Date of Patent: Jun. 23, 1998

[54] AUTOMATIC TRANSMISSION

[75] Inventors: Kazumasa Tsukamoto, Toyota; Masahiro Hayabuchi; Masaaki Nishida, both of Anjo; Kaoru Ono, Nishio, all of Japan

[73] Assignee: Aisin AW Co., Ltd., Japan

[21] Appl. No.: 688,782

[22] Filed: Jul. 31, 1996

[30] Foreign Application Priority Data

Jul. 31, 1995 [JP] Japan ...................... 7-195424

[51] Int. Cl.$^6$ ...................... F16H 3/44
[52] U.S. Cl. .................. 74/606 R; 475/269; 475/276
[58] Field of Search ................... 74/606 R; 475/269, 475/282, 311, 312, 317, 318, 276

[56] References Cited

U.S. PATENT DOCUMENTS

| | | | |
|---|---|---|---|
| 4,971,185 | 11/1990 | Hayakawa et al. | 74/606 R X |
| 5,006,102 | 4/1991 | Takase et al. | 475/282 |
| 5,106,352 | 4/1992 | Lepelletier | 475/284 X |
| 5,224,907 | 7/1993 | Shirataki | 475/312 X |
| 5,232,418 | 8/1993 | Aoki et al. | 475/283 X |
| 5,310,390 | 5/1994 | Shirataki | 475/311 X |
| 5,470,284 | 11/1995 | Taniguchi et al. | 475/204 |
| 5,477,751 | 12/1995 | Akiyama | 74/606 R |
| 5,584,775 | 12/1996 | Miura et al. | 475/284 X |

*Primary Examiner*—Khoi Q. Ta
*Assistant Examiner*—Peter T. Kwon

[57] ABSTRACT

An automatic transmission has a reduced axial dimension and includes a mission case portion providing a mounting surface for a valve body. Forces generated by a hydraulic servo in operation of a brake are confined to the inside of a rear cover joined to the mission case. An extension protrudes from the rear cover and extends into the interior of the mission case with a multi-plate brake splined thereto. The force generated in operation of the brake is received by the cylinder as a reaction force. However, since the hydraulic servo cylinder and the extension are both integral with the rear case, the reaction force is confined to the interior of the rear cover without acting on the mission case.

12 Claims, 8 Drawing Sheets

Operation Table

|  | C1 | C2 | C3 | B1 | B2 | B3 | B4 | B5 | F1 | F2 |
|---|---|---|---|---|---|---|---|---|---|---|
| N |  |  |  |  |  |  |  | O |  |  |
| 1ST | O |  |  |  |  | △ |  | O |  | O |
| 2ND | O |  |  | △ | O |  |  | O | O |  |
| 3RD | O |  |  | △ | O |  | O |  | O |  |
| 4TH | O |  | O | △ | O |  |  |  | O |  |
| 5TH | O | O | O |  |  |  |  |  |  |  |
| REV |  | O |  |  |  | O |  | O |  |  |

O : Engagement    △ : When Engine Brake is in Operation

AUTOMATIC TRANSMISSION

BACKGROUND OF THE INVENTION

1. Field of the Invention

The present invention relates to an automatic transmission having a gear shifting mechanism capable of changing power transmission paths and housed within an integral case and, in particular, to the construction of an integral case for mounting a transversely-mounted engine in a F·F (front engine, front drive) type vehicle, and more specifically to the construction of an integral case comprising a member for receiving the reaction force of a brake.

2. Description of the Prior Art

Automatic transmissions generally have a gear shifting mechanism housed within a divided or integral case including a transmission case and a rear cover which are sealed together.

Transmissions having multiple ranges, such as five forward ranges, are desirable from the viewpoint of improved fuel economy as well as driving performance. Compactness is also desirable for improving mountability of the automatic transmission on the vehicle.

In U.S. Pat. No. 5,470,284 the present inventors disclosed an automatic transmission providing four ranges, achieved by combining a main transmission having three forward ranges with a auxiliary transmission having two ranges. Then, the applicant has slightly modified the auxiliary transmission system arranged on a second shaft to achieve three ranges therein, to thereby obtain five forward ranges overall, while ensuring reliability, without increase in cost, by making some parts interchangeable.

Figure 1:
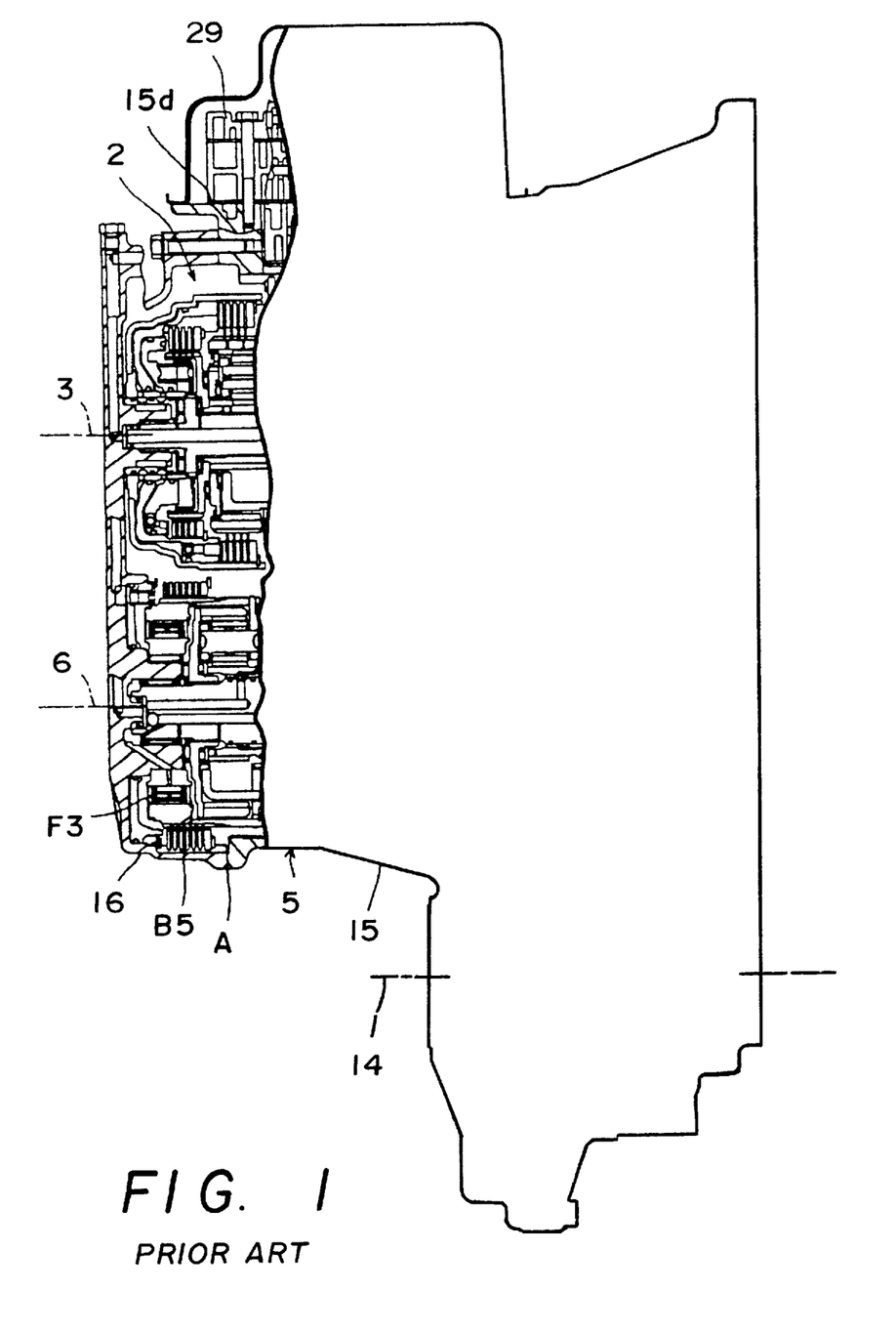
FIG. 1 is a partial sectional side view of a prior art transmission.

As shown in FIG. 1, the automatic transmission has a main transmission 2 on a first shaft 3 as well as a auxiliary transmission 5 on a second shaft 6 parallel to the first shaft 3. The main transmission 2 provides three forward ranges and one reverse range, while the auxiliary transmission 5 provides three forward ranges.

Further, a counter shaft, i.e. second shaft 6, is coupled to a differential device via a gear, and the differential device is coupled to front wheels via left and right axles which together represent a third shaft 14.

Figure 2:
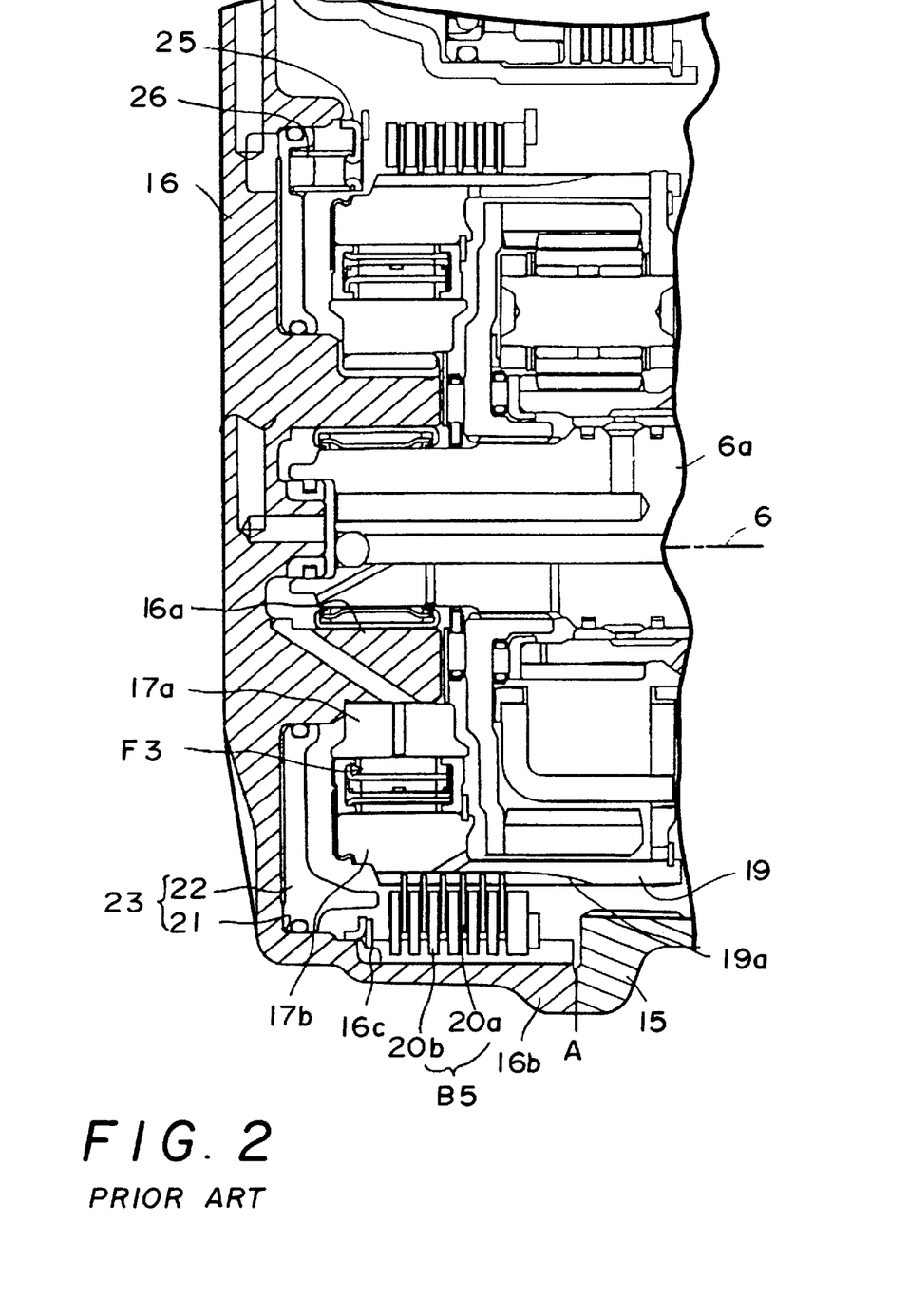
FIG. 2 is an enlarged sectional side view showing a rear end portion of the second shaft in the prior art transmission of FIG. 1.

The main transmission system 2 and the auxiliary transmission 5 are housed in an integral case comprising a transmission case 15 and a rear cover 16, and a fifth brake B5 and a third one-way clutch F3 of the auxiliary transmission 5 are housed in the rear cover 16 portion. As shown in FIG. 2 in more detail, the rear cover 16 has a circular edge portion 16a protruding axially inwardly in the area receiving the second shaft 6, and an outer rim portion 16b axially extending concentrically with the second shaft 6. An inner race 17a of the third one-way clutch F3 is fixed on the outer periphery of the edge portion 16a, and an outer race 17b is formed integrally with a coupling member 19 extending from a carrier of a second planetary gear set.

Further, splines 19a are formed on the outer peripheral surface of the coupling member 19, and splines 16c are formed on the inner peripheral surface of the above-mentioned outer rim portion 16b of the rear cover 16. Inner friction plates 20a and outer friction plates 20b are fitted on splines 19a and 16c, respectively, to form a fifth brake B5. A circular cylinder 21 is formed between the edge portion 16a and the outer rim portion 16b of the rear cover 16 and a hydraulic servo 23 for the fifth brake is formed with a piston 22 fitted into the cylinder 21. A return spring 26 for the above-mentioned hydraulic servo 23 is compressed between a spring bracket 25, securely fastened on the outer rim portion 16b by a snap ring, and the back surface of the piston 22.

The automatic transmission can achieve five forward ranges with a auxiliary transmission system 5 providing three forward ranges disposed on the second shaft 6. However, since a fifth brake B5 and a third one-way clutch F3 are mounted in rear cover 16 portion, the second shaft 6 portion of the case is substantially as long as the first shaft 3 portion on which the main transmission system 2 is arranged.

Since installation of a side member along the side of the bonnet (see FIG. 8) may result in interference of the second shaft 6 portion with the wheel house, it is desirable to reduce the axial dimension of the second shaft 6 portion of the case.

To meet the requirement for a reduced axial dimension of the second shaft portion 6, given approximately the same axial length of the rear cover 16, the joint in plane A between the rear cover 16 and the transmission case 15 is relocated toward the torque converter. Thus, the transmission case 15 can be provided with a reduced axial dimension. However, since there is a need to mount a valve body 29 with a hydraulic control device installed therein in the case 15, it is difficult to form a mounting surface 15d for mounting a valve body 29 of a predetermined length on the mission case 15 having a reduced axial dimension.

While a valve body mounting portion might be provided, extending from the mission case 15 to the rear cover 16, it is extremely difficult to locate and fix the case 15 and the cover 16 in order to form a completely flat mounting surface extending between the mission case 15 and the rear cover 16. Besides, such a design is undesirable in terms of sealability and stability. Further, while a valve body mounting portion might be designed to protrude into the mission case 15, such design might result in a complicated manufacturing process for the mission case 15 and prevent compactness.

On the contrary, if the axial dimension of the rear cover 16 is reduced to substantially the same axial length as that of the mission case 15, the friction plates of a (fifth) brake must be disposed on the mission case side, and the hydraulic servo which operates that brake must be disposed in the rear cover as disclosed in Japanese Utility Model Application Laid-Open No. 6-69510. However, in this case, operation of the brake, in which the piston of the hydraulic servo presses against the friction plates, generates a detaching force which is borne by the joint "All" between the rear cover and the mission case. Thus, the integrity of joint A, which must remain sealed and precisely maintained, is jeopardized.

SUMMARY OF THE INVENTION

Accordingly, an object of the present invention is to provide an automatic transmission in which the above-mentioned disadvantages are eliminated, wherein a case member in which a hydraulic servo is installed (such as a rear cover) has a reduced axial dimension, and wherein the pressing force from the hydraulic servo is received by the case.

An automatic transmission according to the present invention includes an input shaft associated with an engine, an output shaft associated with wheels, and gear shifting units interposed between the input shaft and the output shaft for changing the speed of the input rotation and transmitting it from the input shaft to the output shaft via a plurality of transmission paths. As is conventional, a given transmission path is established by selective engagement of one or more plural friction engagement elements including at least one brake. A valve body, associated with a hydraulic control circuit, controls operation of the friction engagement elements. A case, including at least first and second case members, houses the gear shifting units and the friction engagement elements with the first and second case members being joined in a joint plane (A). The one brake is a multi-plate brake with a plurality of inner friction plates and outer friction plates alternately arranged and a hydraulic servo consisting of a cylinder and piston is provided for pressing against the multi-plate brake for engaging the brake. The first case member has a mounting surface for mounting the valve body and the cylinder of the hydraulic servo is formed integral with the second case member. The second case member has a peripheral extension which protrudes into (extends axially within) the interior of the first case member beyond the joint plane (A), and the outer friction plates of the multi-plate brake are fitted, e.g. splined, to the extension and thereby held against rotation.

Preferably, the above-mentioned first case member is a transmission case and the second case member is a rear cover for closing the rear end of the transmission case.

Preferably, the above-mentioned automatic transmission is a transverse type having a first shaft aligned with the output shaft of a transversely-mounted engine, a second shaft arranged parallel to the first shaft, and a third shaft serving as a front axle.

Further, it is preferable that the gear shifting units should comprise two (2) main gear shifting units arranged on the first shaft, and two (2) auxiliary gear shifting units arranged on the second shaft, and that the one brake serves to change the transmission path through the auxiliary gear shifting units.

In the preferred embodiment, the auxiliary gear shifting units comprise, respectively, first and second single pinion planetary gear sets, wherein the sun gears of these first and second single pinion planetary gear sets are integrally coupled, and wherein the carrier of the first planetary gear set and the ring gear of the second planetary gear set are integrally coupled to each other as well as to the output shaft. The ring gear of the first planetary gear set is coupled to the output shaft of the main gear shifting unit, and the friction engagement elements for changing the transmission path of the auxiliary gear shifting unit include a third clutch interposed between the integral carrier and the ring gear. The integrally coupled sun gears are selectively stopped by a fourth brake, and a fifth brake selectively stops the carrier of the second planetary gear set. In this preferred embodiment the aforementioned one brake is the fifth brake which is arranged in substantial axial alignment with the second planetary gear set and which is radially outward of the ring gear.

The aforementioned axial extension of the rear cover is concentric with the second shaft and comprises a splined portion of a substantially circular shape with splines formed on the inner peripheral surface thereof. The splined portion of the substantially circularly shaped extension has a notch. Splines formed on the outer peripheral surfaces of the outer friction plates are fitted to the splined fitting portion of the extension, and the third shaft is arranged facing the notch.

In operation, rotation from the engine is changed in speed and transmitted to the output members by selectively changing the transmission path through gear shifting units by means of selective operation of the friction engagement elements.

When the one brake is functioning within a certain range, hydraulic pressure is fed to the hydraulic servo. The piston, whose reaction force is received by the cylinder, is extended to press the inner and outer friction plates together. Then, the inner and outer friction plates are brought into contact with a certain rotating element, e.g. the carrier of the second planetary gear set, to stop rotation thereof. In this case, the reaction force to the hydraulic pressure, received by the cylinder serving as a reaction force supporting member, tends to separate the cylinder from the extension to which the force of the piston is applied. However, since the cylinder and the extension are both integrally formed as part of the second case member, e.g. rear cover, the reaction force is confined within the second case member and does not act on the first case member.

BRIEF DESCRIPTION OF THE DRAWINGS

FIGS. 8(a) and 8(b) are schematic diagrams illustrating the mounting arrangement for an automatic transmission on the front portion of a vehicle, where FIG. 8(a) is a side view, and FIG. 8(b) is a plan view.

DESCRIPTION OF THE PREFERRED EMBODIMENTS

Figure 3:
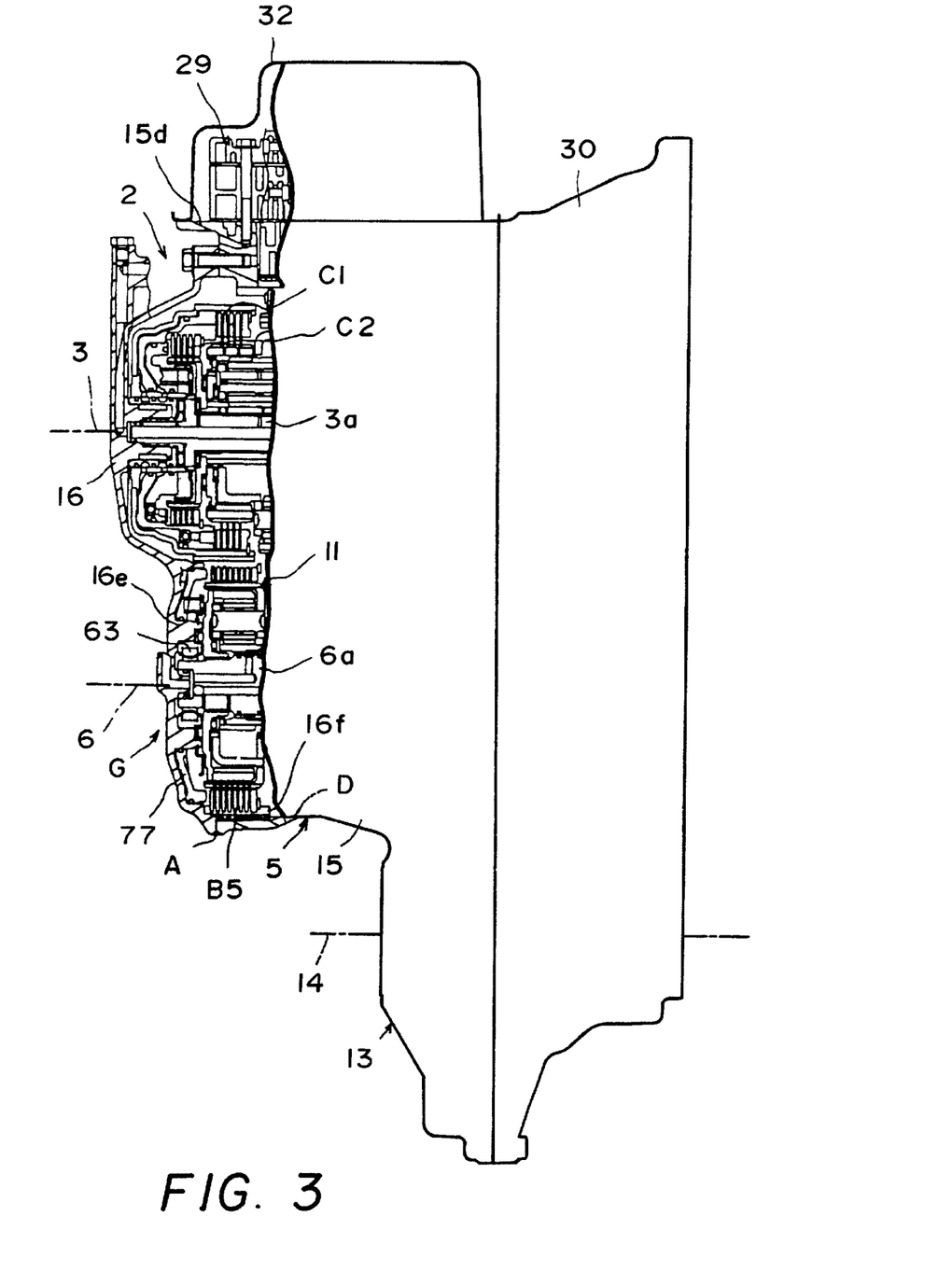
FIG. 3 is a partial sectional side view of one embodiment of the present invention.
Figure 6:
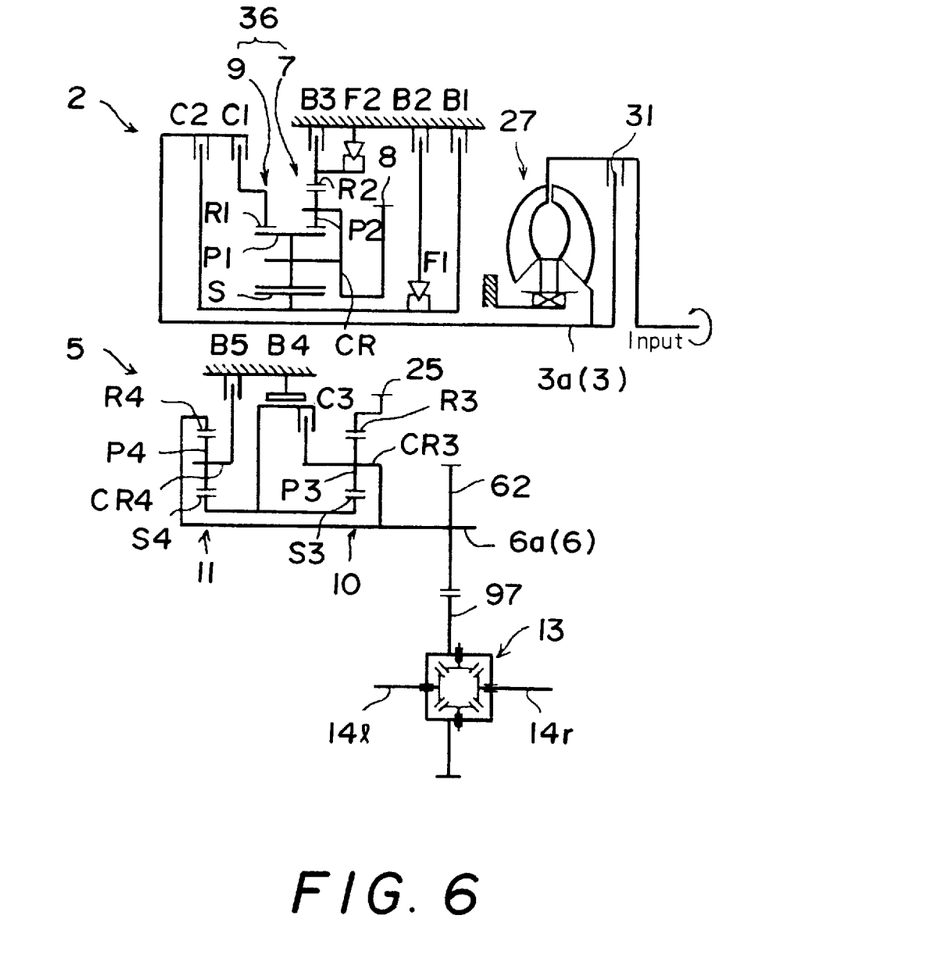
FIG. 6 is a skeletal diagram of an embodiment of the present invention.

FIG. 6 shows a five range automatic transmission including a torque converter 27, a three range main transmission 2, a three range auxiliary transmission 5 and a differential 13, all housed within an integral case comprising a transaxle housing 30, a transmission case 15 and a rear cover 16, integrally joined together as seen in FIG. 3. The torque converter 27 is provided with a lock-up clutch 31, and power is transmitted from an engine crank shaft to the main transmission 5 by means of hydraulic flow in the torque converter 27 or by mechanical engagement of the lock-up clutch 31. A first shaft 3a (input shaft) aligned with the crank shaft, a second shaft 6a (counter shaft) parallel to the first shaft 3a, and a third shaft 14 (left and right shafts 14l, 14r) are rotatably supported by the integral case. A valve body 29 is mounted outside the case and is sealed within a valve case 32 with oil seals.

As illustrated in FIG. 6, the main transmission 2 has a planetary gear unit 36 including a single pinion planetary gear set 9 and a double pinion planetary gear set 7. The single pinion planetary gear set 9 consists of a long sun gear S, a ring gear R1, and a carrier CR supporting a long pinion P1 in engagement with the long sun gear S and the ring gear R1. The double pinion planetary gear set 7 consists of the common long sun gear S, a ring gear R2, and the common carrier CR, supporting the pinion P1 as a common pinion in engagement with the sun gear S and a pinion P2 in engagement with the ring gear R2, so that the pinions P1, P2 are mutually engaged. The planetary gear sets 7, 9 share the common sun gear S, the common carrier CR, and further, the long pinion P1.

The input shaft 3a associated with the engine output shaft via the torque converter 27 can be coupled to the ring gear 9 of the single pinion planetary gear set 9 via the first (forward) clutch C1 and can also be coupled to the common sun gear S via the second (direct) clutch C2. Moreover, the sun gear S can be directly stopped by the first brake B1 and can also be braked by the second brake B2 via the first one-way clutch F1. Further, the ring gear R2 of the double pinion planetary gear set 7 can be braked by the third brake B3 and the second one-way clutch F2. The common carrier CR is coupled to the counter drive gear 8 to serve as the output member of the main transmission 5.

On the other hand, in the auxiliary transmission 5 as illustrated in FIG. 3 and FIG. 6, an output gear 62, a first single pinion planetary gear set 10 and a second single pinion planetary gear set 11 are axially aligned, front to rear, on the counter shaft 6a (second shaft). The counter shaft 6a is rotatably supported by a bearing in the housing 30 and by a bearing 63 on a protrusion 16e of the rear cover 16.

In the first single pinion planetary gear set 10, the ring gear R3 is coupled to the above-mentioned counter driven gear 25, and the sun gear S3 is rotatably supported by the counter shaft 6a. The pinion P3 is supported by the carrier CR3 which is in the form of a flange integrally coupled to the counter shaft 6a and which is coupled to the inner hub of the UD direct clutch C3. In the second planetary gear set 11 of the auxiliary transmission, the sun gear S4 is coupled to the sun gear S3 of the first planetary gear set 10, and the ring gear R4 is coupled to the counter shaft 6a.

The UD direct clutch C3 is interposed between the carrier CR3 of the first planetary gear set 10 and the coupled sun gears S3, S4. The coupled sun gears S3, S4 can be stopped by the fourth brake B4 which is a band brake. Further, the carrier CR4 supporting the pinion P4 of the second single pinion planetary gear set 11 can be stopped by the fifth brake B5.

Figure 4:
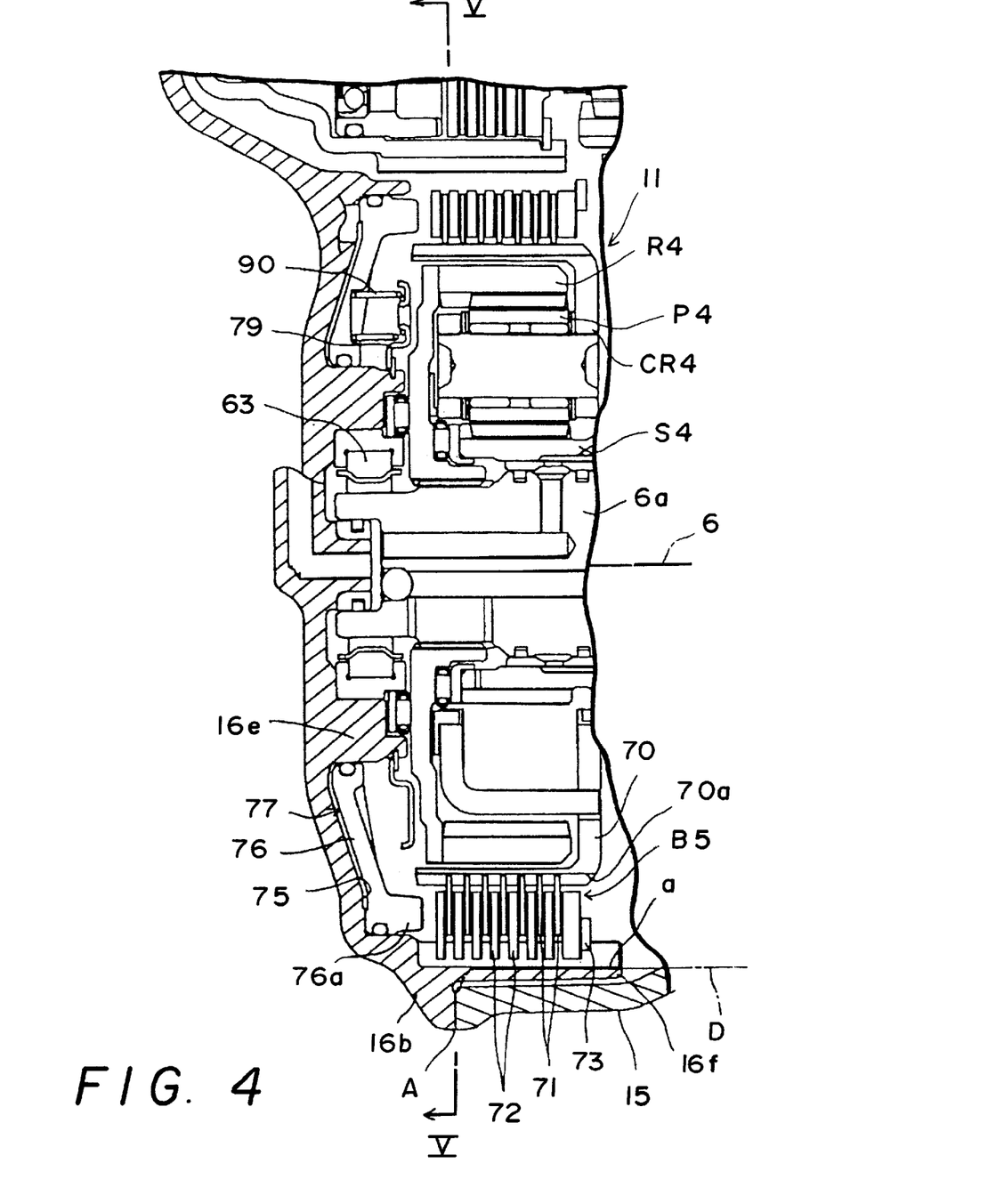
FIG. 4 is an enlarged sectional side view showing a rear end portion of the second shaft according to the embodiment of FIG. 3.
Figure 5:
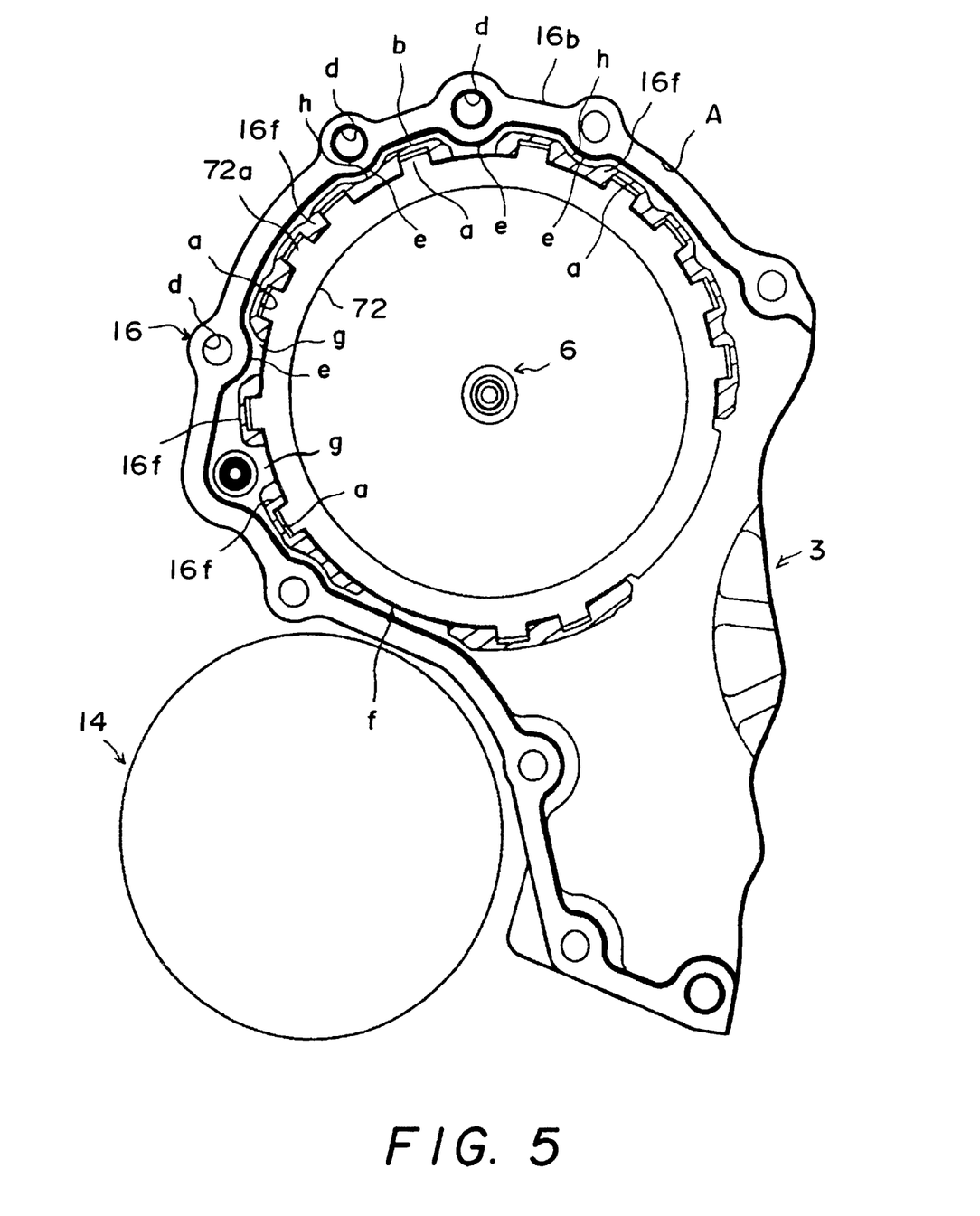
FIG. 5 is a sectional view taken along line V—V in FIG. 4.

As illustrated in FIG. 4, a circular edge portion 16e supports a roller bearing 63, which in turn supports the above-mentioned second shaft 6a (counter shaft), and is formed concentrically with the second shaft 6a. An extension 16f is integral with the rear cover 16 and protrudes therefrom through the joint plane A and into the interior of the mission case 15. The extension 16f extends axially from the inner side of the outer rim portion 16b. The extension 16f is formed in a substantially circular shape along the inner periphery of the outer rim portion 16b as shown in FIG. 5. Also, a number of spline grooves "a" are formed on the inner peripheral surface of the extension 16f as illustrated in FIG. 5. These spline grooves "a" are seen as alternating convex and concave portions on the outer periphery of the extension 16f. The convex portions b fit between enlarged portions e of the rear cover 16 and the mission case 15, which enlarged portions e provide holes d for joining the rear cover 16 and the mission case 15. A notch f is provided in the extension 16f opposing the third shaft 14 to avoid interference with the third (drive) shaft 14 for the front wheels, which will be described later with reference to FIG. 8.

As illustrated in FIG. 4, the fifth brake B5, is arranged at substantially the same position as the above-mentioned second single pinion planetary gear set 11, concentric with, radially aligned with and radially outward of the ring gear R4. B5 is a multi-plate brake having a plurality of inner friction plates 71 and outer friction plates 72 alternately arranged. Splines formed on the inner peripheral surfaces of the inner friction plates 71 engage splines 70a formed on the outer peripheral surface of the above-mentioned inner hub 70, and the spline teeth 72a (see FIG. 5) formed on the outer peripheral surface of the outer friction plates 72 are in engagement with the above-mentioned spline grooves "a" of extension 16f. The inner hub 70 of the fifth brake B5 extends radially outward from the carrier CR 4 of the fourth single pinion planetary gear set 11 and is concentric with, radially aligned with and radially outward of the ring gear R4. Thus the inner hub 70 is substantially radially aligned with the fourth single pinion planetary gear set 11. A snap ring 73 is fitted around extension 16f to secure the inner and outer friction plates 71, 72 of the fifth brake B5.

A cylinder 75 is formed in a circular space between the above-mentioned edge portion 16e and the extension 16f of the rear cover 16. A piston is fitted in the cylinder 75 with oil seals, and a circular projection 76a formed on the back surface of the piston 76 opposes the multi-plate fifth brake B5, forming a hydraulic servo 77 for the brake. A metal spring retainer 79 is securely fitted to the outer peripheral surface of the edge portion 16e of the rear cover with a snap ring. A return spring 90 is compressed between the spring retainer 79 and the back surface of the above-mentioned piston 76.

Moreover, a differential device 13 is arranged on the third shaft 14 serving as the front axle as illustrated in FIG. 6. The differential device 13 distributes rotation from the output gear 62 to the left and right front wheel axles 14l, 14r.

Since the fifth brake B5 is arranged radially outward of the second single pinion planetary 11, and the fifth brake B5 and the third one-way clutch F3 are not arranged to the rear of the second single pinion planetary gear set 11, unlike the prior art as shown in FIG. 2, the auxiliary transmission unit 5, which is arranged on the second shaft 6, can be made axially shorter. Accordingly, the rear cover 16 is formed, as shown in FIG. 3, to accommodate a second shaft 6a shorter in the axial direction than the conventional one as shown in FIG. 1. Thus, part of the rear cover 16 is concave, i.e. the portion of the rear cover supporting second shaft 6a is axially inward of the rear cover portion receiving the first shaft 3a, on which the main transmission system 2 is arranged.

Figure 8A:
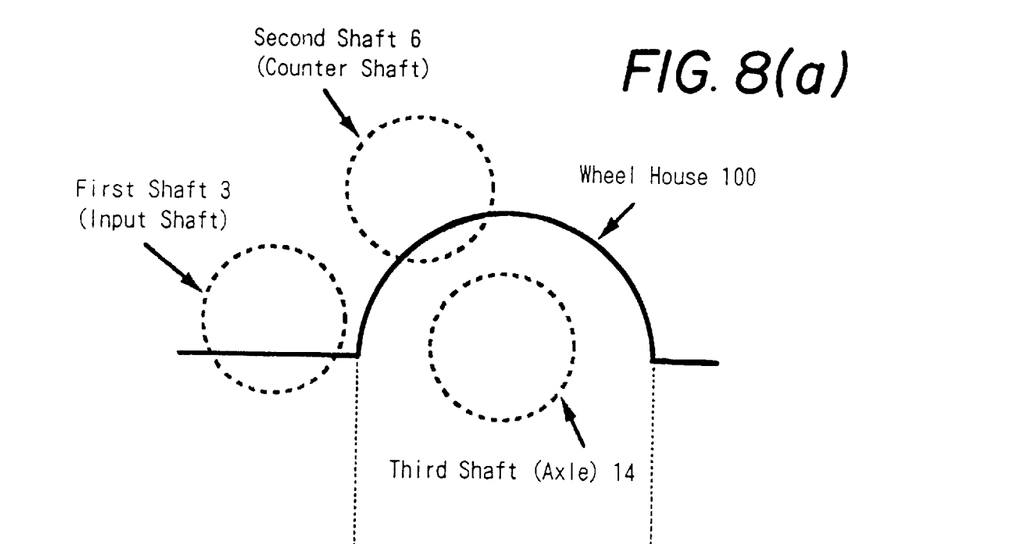
Figure 8B:
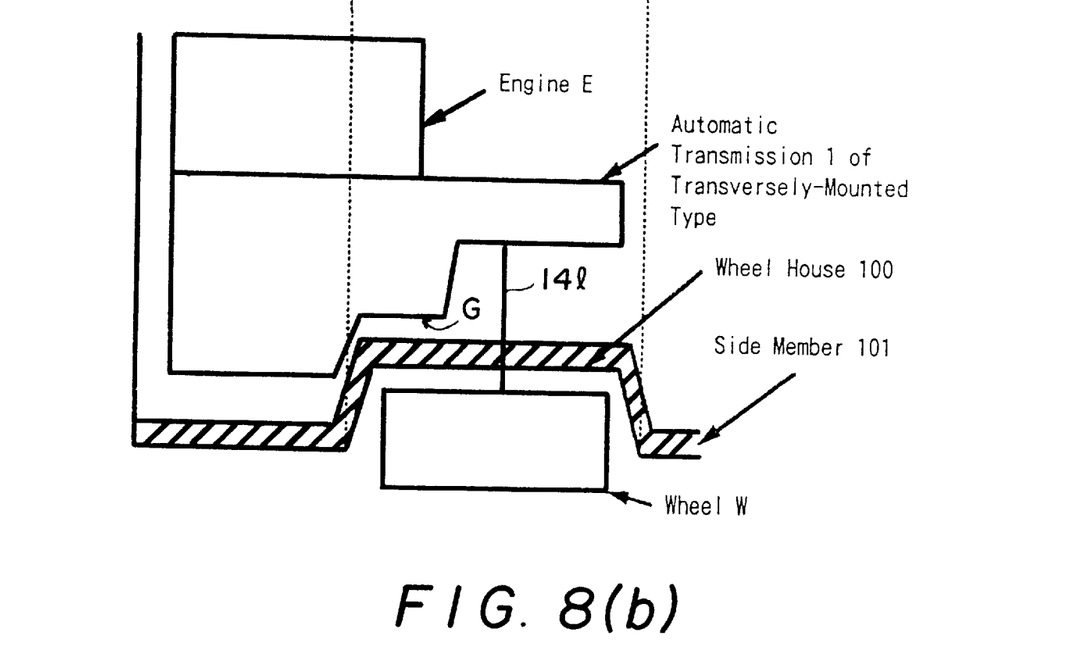

FIG. 8(b) is a plan view illustrating installation of the transversely-mounted engine E and the transverse type automatic transmission 1 on a vehicle, in which a side wall 101 is shaped to form a wheel house 100 for the wheels W. FIG. 8(a) is a side view illustrating the relationship between the first shaft (input) 3a, the second shaft (counter shaft) 6a and the third shaft (axle) 14 of the automatic transmission 1 and the above-mentioned wheel house 100. As mentioned above, the automatic transmission 1 according to this embodiment has a concave contour with the portion of the rear cover 16 supporting the second shaft 6a being axially shorter. Thus this concave portion, shown as G in FIG. 8b, accommodates the wheel house 100, preventing interference with the wheel W by the side member 101. Further, since the above-mentioned notch f in the extension 16f of the rear cover 16 is located opposite to the third shaft 14, the corresponding portion of the mission case 15 can be radially smaller (see line D in FIGS. 3 and 4) to prevent interference with the axle (third shaft) 14l, or the like.

The joint plane A between the rear cover 16 and the mission case 15 is located at substantially the same position as in the conventional case illustrated in FIG. 1 and FIG. 2. Thus, despite a shorter automatic transmission, the second shaft portion in particular, the mission case 15 has a substantially the same axial length as the conventional case and provides as well a mounting portion 15d for the valve body 29 similar to the conventional design.

Now, operation of the foregoing embodiment will be explained with reference to FIG. 6 and FIG. 7.

In the first range (1ST), since the forward clutch C1 is engaged, the second one-way clutch F2 and the fifth brake B5 operate to brake and hold the ring gear R2 of the double pinion planetary gear set and the carrier CR4/the sun gear S3 of the second single pinion planetary gear set 11. In this state, since rotation of the input shaft 3a is transmitted to the ring gear R1 of the single pinion planetary gear set via the forward clutch C1, and the ring gear R2 of the double pinion planetary gear is stopped, the common carrier CR rotates at a drastically reduced rate in the positive direction while idling the sun gear S in the reverse direction. Thus, the main transmission 2 is in the first range, and the reduced rotational speed is transmitted to the ring gear R3 of the first single pinion planetary gear set in the auxiliary transmission 5 via the counter gears 8, 25. The carrier CR4 of the second single pinion planetary gear is stopped by the fifth brake B5 to establish the first range state in the auxiliary transmission system 5. Thus the above-mentioned reduced rotational speed of the main transmission 2 is further reduced by the auxiliary transmission 5 and output from the output gear 62.

In the second range (2ND), in addition to the forward clutch C1, the second brake B2 is engaged. Then, engagement is switched from the second one-way clutch F2 to the first one-way clutch F1, and the fifth brake B5 is maintained in operation. In this state, the common sun gear S is stopped by the second brake B2 and the first one-way clutch F1. Thus, the rotation of the ring gear R1 of the single pinion planetary gear transmitted from the input shaft 3a via the forward clutch C1 causes the carrier CR to rotate at a reduced rate in the positive direction while idling the ring gear R2 of the double pinion planetary gear in the positive direction. The main transmission 2 is in the second range and the auxiliary transmission 5 is in the first range, owing to the engagement of the fifth brake B5, which combination achieves the second range for the automatic transmission 1 as a whole.

In the third range (3RD), the forward clutch C1, the second brake B2 and the first one-way clutch F1 are maintained in the engaged state, with the fifth brake B5 released and the fourth brake B4 engaged. Thus, in a shift from 2nd to 3rd no change occurs in the main transmission 2, and the same rotational speed achieved in the second range is transmitted to the auxiliary transmission 5 via the counter gears 8, 25. In the auxiliary transmission 5, rotation from the ring gear R3 of the first planetary gear set is output from the carrier CR3 as the second range rotation owing to the fixation of the sun gear S3. Thus, the combination of the second range in the main transmission 2 and the second range in the auxiliary transmission 5 achieves the third range in the automatic transmission 1 as a whole.

In the fourth range (4TH), the main transmission 2 is in the same state as in the second and third ranges states described above, with the forward clutch C1, the second brake B2 and the first one-way clutch F1 engaged. In the auxiliary transmission system 5, the fourth brake B4 is released and the UD direct clutch C3 is engaged. In this manner, the ring gear R3 of the first single pinion planetary gear set and the sun gears S4, S3 are coupled to provide lock-up rotation, namely, integral rotation of the planetary gear sets 10 and 11. Therefore, the combination of the second range in the main transmission 2 and the lock-up (third range) in the auxiliary transmission gives fourth range rotation, output from the output gear 12, for the automatic transmission 1 as a whole.

In the fifth range (5TH), since the forward clutch C1 and the direct clutch C2 are engaged, rotation of the input shaft 3a is transmitted to the ring gear Rl of the single pinion planetary gear set and to the sun gear S, and the main transmission system 2 is in a lock-up state, i.e. with integral rotation of the entire gear unit. Moreover, the auxiliary transmission 5 provides lock-up rotation with the UD direct clutch C3 engaged. Consequently, the combination of the third range (lock-up) of the main transmission 2 with the third range (lock-up) of the auxiliary transmission 5 serves to output fifth range rotation from the output gear 12 for the automatic transmission 1 as a whole.

In reverse (REV), the direct clutch C2, the third brake B3 and the fifth brake B5 are engaged. In this state, since rotation of the input shaft 3a is transmitted to the sun gear S via the direct clutch C2, and the ring gear R2 of the double pinion planetary gear is braked by the third brake B3, the carrier CR is caused to rotate in the reverse direction, while idling the ring gear R1 of the single pinion planetary gear set in the reverse direction. Then, the reverse rotation is transmitted to the auxiliary transmission 5 via the counter gears 8, 25. In the auxiliary transmission 5, the carrier CR4 of the second single pinion planetary gear set is held against reverse rotation by the fifth brake B5 to maintain the first range. Accordingly, the combination of the reverse rotation of the main transmission 2 and the first range rotation of the auxiliary transmission 5 provides a reduced rotational speed in the reverse direction from the output shaft 62.

Figure 7:
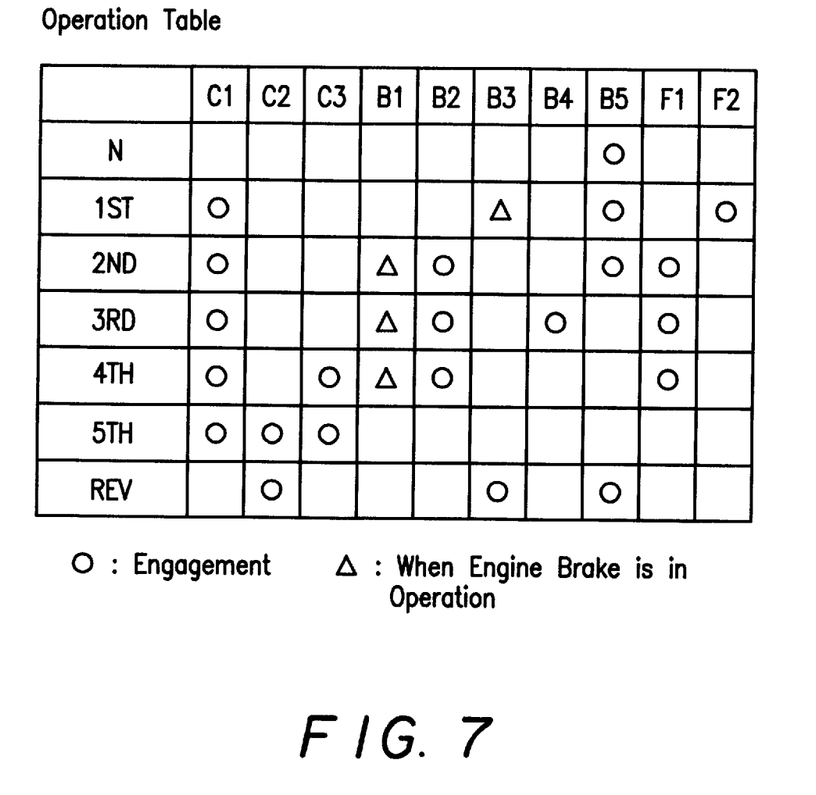
FIG. 7 is a table showing the operations of the embodiment of FIG. 6.

Engine braking is denoted by triangles in FIG. 7. That is, in the first range, the third brake B3 is engaged to fix the ring gear F2 of the double pinion planetary gear set, instead of the second one-way clutch F2. In the second, third, and fourth ranges, the first brake B1 is engaged to fix the sun gear S, instead of the first one-way clutch F1.

Then rotation of the above-mentioned output gear 62 is transmitted to the differential device 13 via the ring gear 97 and further distributed by the differential device to the left and right front wheels W via the left and right axles 14l, 14r, according to the load imposed on the wheels W.

Moreover, in the first, second, reverse, and neutral (N) ranges, the fifth brake B5 is engaged. For engagement of the fifth brake B5, piston 76 is caused to extend by the hydraulic pressure applied to the hydraulic chamber of the hydraulic servo 77, pressing protrusion 76a against the inner and outer friction plates 71 and 72. The hydraulic reaction force is received by the cylinder 75 formed in the rear cover 16, while the force of the piston 76 is applied to the extension 16f via the inner/outer friction plates 71, 72 and the snap ring 73. In this case, since both the cylinder 75 and the extension 16f are formed integral with the rear cover 16, the forces generated by the hydraulic pressure are confined to the inside of the cover 16, rather than acting on the joint plane A.

Although a five speed automatic transmission has been adopted in the above-described embodiment, the present invention is not limited thereto and is also applicable to a transmission having a auxiliary transmission of a different type, to a transmission having brake means in the main transmission, to an automatic transmission having four or more than five ranges, and to a vertically-mounted automatic transmissions for FR.

As described above, in the present invention, the hydraulic cylinder is formed in the second case member and the extension protruding toward the inside of the first case member is securely fitted to the outer friction plates. Therefore, notwithstanding the reduced axial dimension of the second case member, the pressing force produced by the operation of the brake means can be confined to the inside of the second case member without imposing any load on the joint plane between the first and second case members. Thus, the joint is maintained in a desirable state over a long period of time.

Further, along with the reduction of the axial dimension of the second case member, even if the portion receiving the second shaft is shortened, a valve body can be mounted on the first case member without shortening the first case member. Thus the precise and secure mounting of the valve body can be achieved with a simple construction without sacrificing the compactness of the automatic transmission.

Moreover, by providing the second case member as a rear cover, the cylinder of the hydraulic servo can be easily formed. As a result, shortening of the axial dimension of the automatic transmission is ensured.

Further, in applying the present invention to a transversely-mounted automatic transmission comprising first, second, and third shafts, the mountability of the automatic transmission is improved owing to the reduction of the axial dimension.

Moreover, with the main gear shifting units arranged on the first shaft and the auxiliary gear shifting units on the second shaft, while enabling multi-stage shifting in as many as five forward ranges, the axial dimension of the second shaft portion can be reduced by arranging the above-mentioned brake on the auxiliary transmission gear units. Accordingly, although the second shaft portion is located at a position which would otherwise tend to cause interference with the wheel house, such interference is avoided. Thus, in this respect also, the mountability of the automatic transmission on the vehicle is improved.

Besides, by providing "Simpson type" auxiliary gear shifting units, comprising the first and second single pinion planetary gear sets and arranging the above-mentioned brake means axially aligned with the second single pinion planetary gear set and radially outward of the ring gear, the second shaft portion can be shortened.

Further, by notching part of the circular portion of the above-mentioned extension, and forming the notch opposing the third shaft, the second shaft portion opposing to the third shaft can be radially reduced. Thus, interference with the axle (the third shaft) is prevented and the mountability of the automatic transmission on the vehicle is further improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An automatic transmission comprising:
   an input member for receiving torque from an engine;
   output members for outputting torque to vehicle drive wheels;
   gear shifting units interposed between said input member and said output members for changing speed of rotation of the input engine torque and for transmitting rotation from said input member to said output members via one of a plurality of torque transmission paths;
   friction engagement means including at least one brake for changing the transmission path, said one brake being in the form of a multi-plate brake having a plurality of inner friction plates and outer friction plates alternately arranged;
   a valve body and a hydraulic control circuit for controlling said friction engagement means;
   a hydraulic servo including a piston for pressing the multiplate brake into engagement operating state and a cylinder slidably accommodating the piston responsive to oil pressure received through said hydraulic control circuit;
   a case including at least first and second case members and housing said gear shifting units and said friction engagement means, said first and second case members being joined together in a joint defining a joint plane, said valve body being mounted on said first case member and said cylinder being integrally formed in said second case member, said second case member including an integral extension extending from said second case member, through said joint plane and into the interior of said first case member, the outer friction plates of said one brake being engaged and held against rotation by said extension.

2. The automatic transmission according to claim 1, wherein the first case member is a transmission case and the second case member is a rear cover closing the rear end of the transmission case.

3. The automatic transmission according to claim 1, wherein the automatic transmission is transversely-mounted and has a first shaft aligned with an output shaft of a transversely-mounted engine, a second shaft arranged parallel to the first shaft, and a third shaft serving as a front axle.

4. The automatic transmission according to claim 3, wherein said gear shifting units include main gear shifting units arranged on the first shaft and auxiliary gear shifting units arranged on the second shaft, the torque transmission path through said auxiliary gear shifting units being changed by selective engagement of said one brake.

5. The automatic transmission according to claim 4, wherein:
   said auxiliary gear shifting units comprise first and second single pinion planetary gear sets, each of said first and second single pinion planetary gear sets including a sun gear, a carrier, a pinion and a ring gear with the sun gears of said first and second planetary gear sets being integrally coupled, the carrier of said the first single pinion planetary gear set and the ring gear of the second single pinion planetary gear being integrally coupled together as well as to one of said output members, the ring gear of said first single pinion planetary gear set receiving torque input from said main gear shifting units; and
   said friction engagement means further includes a clutch interposed between the integrally coupled carrier and ring gear and the integrally coupled sun gears, a second brake for selectively braking the integrally coupled sun gears, and a third brake for selectively braking the carrier of the second single pinion planetary gear, said third brake being arranged substantially axially aligned with the second single pinion planetary gear set and radially outward of the ring gear.

6. The automatic transmission according to claim 2, wherein the automatic transmission is transversely-mounted and has a first shaft aligned with an output shaft of a transversely-mounted engine, a second shaft arranged parallel to the first shaft, and a third shaft serving as a front axle.

7. The automatic transmission according to claim 5, wherein said gear shifting units include main gear shifting units arranged on the first shaft and auxiliary gear shifting units arranged on the second shaft, the torque transmission path through said auxiliary gear shifting units being changed by selective engagement of said one brake.

8. The automatic transmission according to claim 6, wherein:
said auxiliary gear shifting units comprise first and second single pinion planetary gear sets, each of said first and second single pinion planetary gear sets including a sun gear, a carrier, a pinion and a ring gear with the sun gears of said first and second planetary gear sets being integrally coupled, the carrier of said the first single pinion planetary gear set and the ring gear of the second single pinion planetary gear being integrally coupled together as well as to one of said output members, the ring gear of said first single pinion planetary gear set receiving torque input from said main gear shifting units; and
said friction engagement means further includes a clutch interposed between the integrally coupled carrier and ring gear and the integrally coupled sun gears, a second brake for selectively braking the integrally coupled sun gears, and a third brake for selectively braking the carrier of the second single pinion planetary gear, said third brake being arranged substantially axially aligned with the second single pinion planetary gear set and radially outward of the ring gear.

9. The automatic transmission according to claim 3, wherein said extension is concentric with said second shaft and comprises a splined portion of a substantially circular shape and has a notch facing said third shaft, said outer friction plates having peripheral splines meshed with said splined portion.

10. The automatic transmission according to claim 5, wherein said extension is concentric with said second shaft and comprises a splined portion of a substantially circular shape and has a notch facing said third shaft, said outer friction plates having peripheral splines meshed with said splined portion.

11. The automatic transmission according to claim 7, wherein said extension is concentric with said second shaft and comprises a splined portion of a substantially circular shape and has a notch facing said third shaft, said outer friction plates having peripheral splines meshed with said splined portion.

12. The automatic transmission according to claim 2 wherein said input member is a shaft defining an axis for the transmission and wherein said joint plane extends perpendicular to said axis.

* * * * *

UNITED STATES PATENT AND TRADEMARK OFFICE
CERTIFICATE OF CORRECTION

PATENT NO. : 5,768,952
DATED : June 23, 1998
INVENTOR(S) : TSUKAMOTO et al

It is certified that error appears in the above-indentified patent and that said Letters Patent is hereby corrected as shown below:

Col. 2, line 47, "All" should read --A--.

Signed and Sealed this

Twenty-third Day of March, 1999

Attest:

Q. TODD DICKINSON

*Attesting Officer*  *Acting Commissioner of Patents and Trademarks*